US008197981B2

(12) United States Patent
Kelly et al.

(10) Patent No.: US 8,197,981 B2
(45) Date of Patent: Jun. 12, 2012

(54) FUEL CELL STACK HAVING A FEATURED INTERCONNECT ELEMENT

(75) Inventors: Sean M. Kelly, Churchville, NY (US); Diane M. England, Bloomfield, NY (US); Subhasish Mukerjee, Rochester, NY (US); John Weber, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 1280 days.

(21) Appl. No.: 11/095,063

(22) Filed: Mar. 31, 2005

(65) Prior Publication Data

US 2005/0194720 A1 Sep. 8, 2005

Related U.S. Application Data

(63) Continuation of application No. 09/969,487, filed on Oct. 2, 2001, now abandoned.

(51) Int. Cl.
H01M 2/20 (2006.01)
H01M 8/24 (2006.01)

(52) U.S. Cl. ..................... 429/468; 429/507

(58) Field of Classification Search .......... 429/12, 429/468, 507
See application file for complete search history.

(56) References Cited

U.S. PATENT DOCUMENTS

| 4,548,876 A | 10/1985 | Bregoli |
| 4,702,973 A | 10/1987 | Marianowski |
| 5,049,458 A * | 9/1991 | Sato et al. .................. 429/32 |
| 5,094,928 A | 3/1992 | Dyer |
| 5,436,091 A * | 7/1995 | Shackle et al. ............. 429/304 |
| 5,460,897 A | 10/1995 | Gibson |
| 5,501,914 A | 3/1996 | Satake et al. |
| 5,643,690 A | 7/1997 | Tateishi et al. |
| 5,678,647 A | 10/1997 | Wolfe |
| 5,691,075 A | 11/1997 | Batawi |
| 5,693,201 A | 12/1997 | Hsu et al. |
| 5,795,665 A * | 8/1998 | Allen .......................... 429/12 |
| 5,798,188 A * | 8/1998 | Mukohyama et al. ........ 429/34 |
| 5,827,620 A | 10/1998 | Kendall |
| 5,851,689 A | 12/1998 | Chen |
| 6,230,494 B1 | 5/2001 | Botti et al. |
| 6,265,095 B1 | 7/2001 | Hartvigsen et al. |
| 6,296,962 B1 | 10/2001 | Minh |
| 6,316,136 B1 | 11/2001 | Batawi |
| 6,316,138 B1 * | 11/2001 | Satake et al. ............... 429/36 |
| 6,383,677 B1 | 5/2002 | Allen |
| 6,423,896 B1 | 7/2002 | Keegan |
| 6,485,852 B1 | 11/2002 | Miller et al. |
| 6,500,574 B2 | 12/2002 | Keegan |
| 6,509,113 B2 | 1/2003 | Keegan |

(Continued)

OTHER PUBLICATIONS

U.S. Appl. No. 09/969,487, filed Oct. 2, 2001, Kelly et al.

Primary Examiner — Tracy Dove
(74) Attorney, Agent, or Firm — Thomas N. Twomey

(57) ABSTRACT

An interconnect element for electrically connecting an anode and a cathode in adjacent fuel cells in a fuel cell stack, wherein said interconnect element has at least one featured surface including dimples, bosses, and/or pins arranged in a two-dimensional pattern. Preferably, both surfaces are featured, as by mechanical dimpling, embossing, or chemical etching, so that protrusions of the interconnect surface extend into either or both of the adjacent gas flow spaces to make electrical contact with the surfaces of the anode and cathode. This permits conduction of heat from the anode. The protrusions create turbulence in gas flowing through the flow spaces, which increases hydrogen consumption at the anode and hence electric output of the cell.

9 Claims, 6 Drawing Sheets

U.S. PATENT DOCUMENTS

| | | |
|---|---|---|
| 6,544,681 B2 | 4/2003 | McLean et al. |
| 6,551,734 B1 | 4/2003 | Simpkins et al. |
| 6,562,496 B2 | 5/2003 | Faville et al. |
| 6,608,463 B1 | 8/2003 | Kelly et al. |
| 6,609,582 B1 | 8/2003 | Botti et al. |
| 6,613,468 B2 | 9/2003 | Simpkins et al. |
| 6,613,469 B2 | 9/2003 | Keegan |
| 6,620,535 B2 | 9/2003 | Mukerjee et al. |
| 2002/0004155 A1 | 1/2002 | Haltiner, Jr. et al. |

* cited by examiner

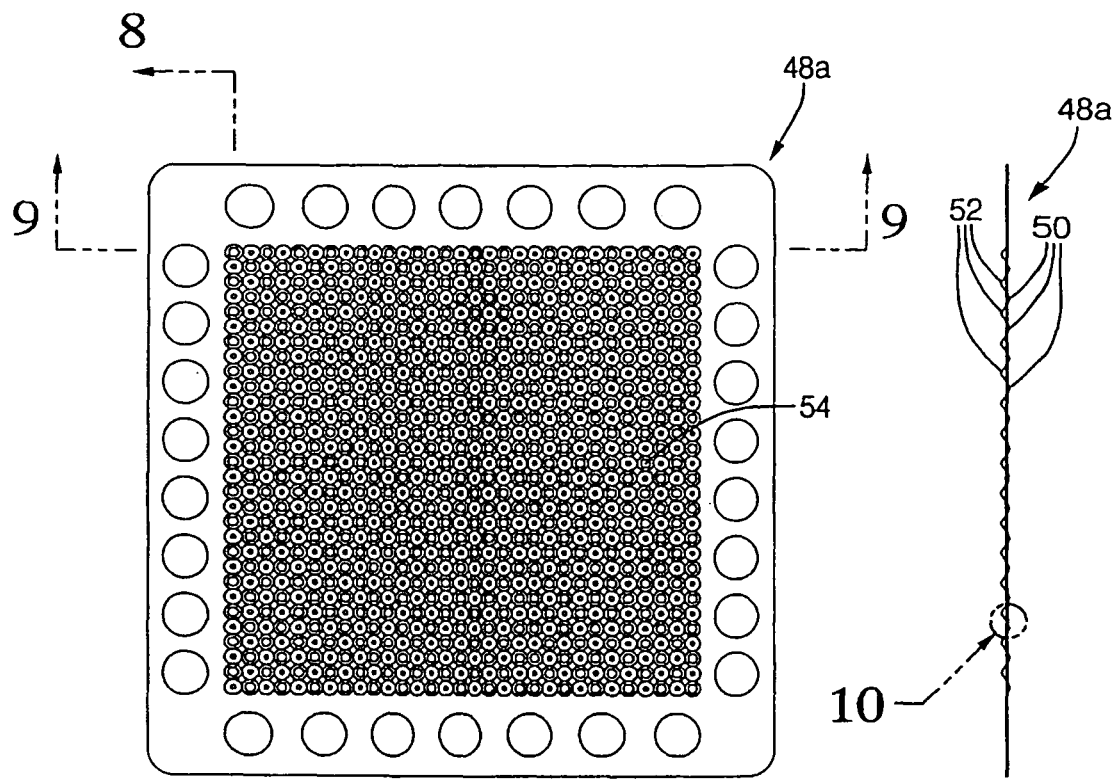
FIG. 7
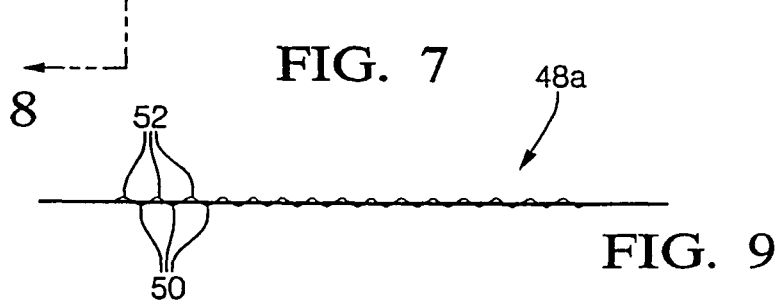
FIG. 8
FIG. 9
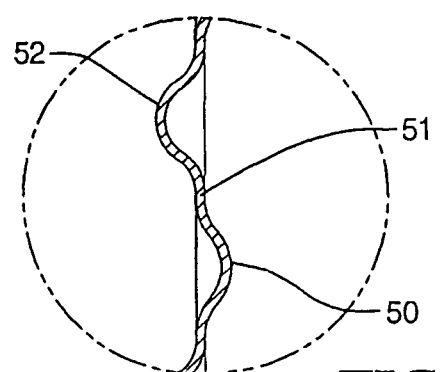
FIG. 10

FUEL CELL STACK HAVING A FEATURED INTERCONNECT ELEMENT

CROSS REFERENCE TO RELATED APPLICATIONS

This application is a continuation of U.S. application Ser. No. 09/969,487, which was filed on Oct. 2, 2001 now abandoned.

TECHNICAL FIELD

The present invention relates to fuel cells; more particularly, to stacks comprising a plurality of individual cells being both physically separated and electrically connected by interconnect elements; and most particularly, to such a fuel cell stack wherein the interconnect elements are featured on their surfaces in a predetermined pattern to form direct electrical connections with the adjacent anode and/or cathode surfaces.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid oxide fuel cell" (SOFC). Either pure hydrogen or reformate is flowed along the outer surface of the anode and diffuses into the anode. Oxygen, typically from air, is flowed along the outer surface of the cathode and diffuses into the cathode. Each $O_2$ molecule is split and reduced to two $O^{-1}$ ions at the cathode/electrolyte interface. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived from "reformed" hydrocarbons, the "reformate" gas includes CO which is converted to $CO_2$ at the anode/electrolyte interface. Reformed gasoline is a commonly used fuel in automotive fuel cell applications.

A single cell is capable of generating a relatively small voltage and wattage, typically about 0.7 volts and less than about 2 watts per $cm^2$ of active area. Therefore, in practice it is usual to stack together in electrical series a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. Adjacent cells are connected electrically by "interconnect" elements in the stack, the interconnect elements typically being unfeatured flat plates formed of a superalloy or stainless steel. The outer surfaces of the anodes and cathodes are electrically connected to their respective interconnects by electrical contacts disposed within the gas-flow space, typically by a metallic foam which is readily gas-permeable or by conductive filaments. The outermost, or end, interconnects of the stack define electrical terminals, or "current collectors," connected across a load.

For electrochemical reasons well known to those skilled in the art, an SOFC requires an elevated operating temperature, typically 750° C. or greater.

For steric reasons, fuel cells are preferably rectangular in plan view. Typically, gas flows into and out of the cells through a vertical manifold formed by aligned perforations near the edges of the components, the hydrogen flowing from its inlet manifold to its outlet manifold across the anodes in a first direction, and the oxygen flowing from its inlet manifold to its outlet manifold across the cathodes in a second direction. Thus, fuel cells are typically square in horizontal plan. The flat interconnect forms the opposite wall of the passageway for gas flow past either electrode.

One problem encountered in prior art cells fueled by reformate is that hydrogen utilization is relatively low. The flow space for reformate between each anode and its associated interconnect promotes laminar flow of gas across the anode surface. As hydrogen is depleted from the gas stream at the anode surface, it is not readily replaced. Increasing the flow rate through the flow space can decrease laminarity and increase turbulence but at an increase in throughput of unreacted hydrogen. What is needed is a means for increasing turbulence in the flowing reformate without increasing flow rate.

Another problem encountered in prior art fuel cells is that localized high temperatures occur in regions of the anode supporting the highest rates of hydrogen/oxygen reaction. Such high temperatures, especially when unevenly distributed over the anode, can be damaging to the anode. Excess heat is abstracted from the fuel cell by the cooling effect of air passing between the interconnects and the cathodes, but this cooling is generalized over the entire interconnect surface and further depends upon radiative emission of heat from the anode into the interconnect through the hydrogen flow space. What is needed is a means for removing heat directly from the anode in local regions of high heat generation.

Another problem encountered in prior art cells fueled by reformate is that, through non-uniform flow of reformate across the anode surface, local regions of low hydrogen concentration can occur. In these regions, oxygen ions electrically migrating through the electrolyte to the anode are not all consumed in reaction with hydrogen and carbon monoxide. Nickel in the anode can be oxidized by a surfeit of oxygen ions, leading to failure of the fuel cell. What is needed is a means for electrically restricting the flow of oxygen ions through the electrolyte, in any regions desired, to optimize the consumption of hydrogen and carbon monoxide without oxidizing nickel in the anode.

It is an object of the present invention to reduce the formation of localized superheated regions in the anode.

It is a further object of the invention to reduce the number of components in a fuel cell stack by eliminating the need for a filamentous pad between the electrodes and the interconnects.

SUMMARY OF THE INVENTION

Briefly described, a fuel cell stack in accordance with the present invention has first and second flow spaces for the respective passage of reformate gas across the surface of the anodes and oxygen gas along the surface of the cathodes. Adjacent fuel cells are separated by a conductive interconnect element which connects the cells electrically and also forms a wall between a first flow space in one of the fuel cells and a second flow space in the adjacent fuel cell. In the prior art, the interconnects are planar and smooth-surfaced. In accordance with the present invention, the interconnects have one or both surfaces featured, as by mechanical dimpling or embossing, or by chemical etching, so that protrusions of the interconnect surface extend into either or both of the adjacent gas flow spaces. The protrusions increase the surface area of the interconnect, improving removal of heat from the anode side to the cathode side. Preferably, at least a portion of the protrusions are sufficiently high to make mechanical, and therefore electrical, contact with the surface of the adjacent anode and/or cathode. This permits the abstraction of heat from the anode by conduction in addition to radiation, and also obviates the need for filamentous pads in the flow spaces of the stack for electrical connection of the electrodes to the interconnects. Further, the pattern of protrusions electrically contacting the anode may be non-uniform and may be optimized to meter the flow of oxygen ions through the electrolyte to the anode in any regions desired, to optimize the consumption of hydrogen and carbon monoxide without oxidizing nickel in the anode.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 7 is a plan view of a non-planar dimpled and bossed interconnect for a fuel cell stack, showing a regular two-dimensional arrangement of dimples and bosses;

FIG. 8 is a cross-sectional view taken along line 8-8 in FIG. 7;

FIG. 9 is a cross-sectional view taken along line 9-9 in FIG. 7; and

FIG. 10 is an enlarged view of a portion of the view shown in FIG. 8, taken at circle 10.

DESCRIPTION OF THE PREFERRED EMBODIMENTS

Figure 1:
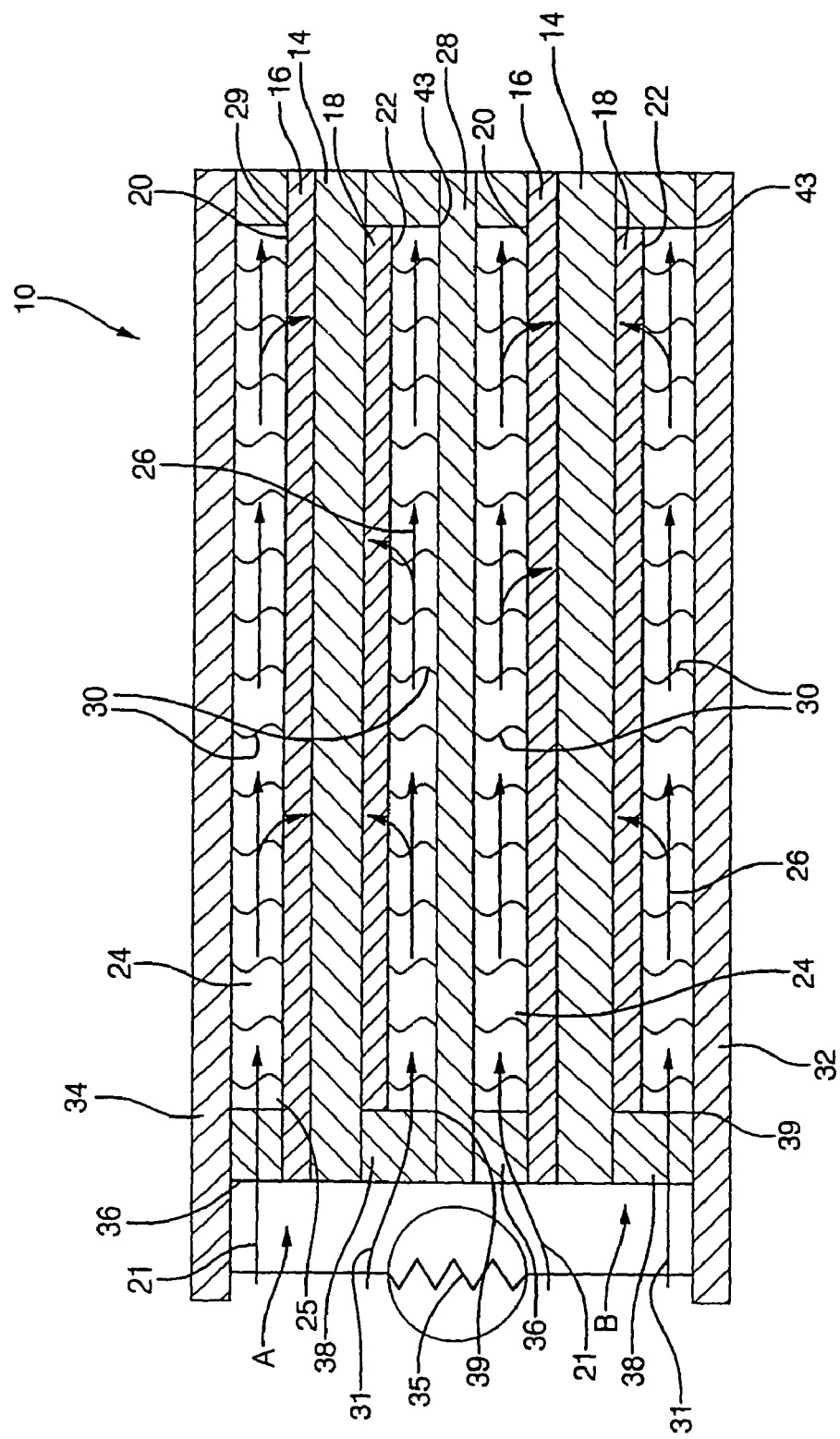
FIG. 1 is a schematic cross-sectional view of a prior art two-cell stack of solid oxide fuel cells.

Referring to FIG. 1, a prior art fuel cell stack 10 includes elements normal in the art to solid oxide fuel cell stacks comprising more than one fuel cell. The example shown includes two fuel cells A and B, connected in series, and is of a class of such fuel cells said to be "anode-supported" in that the anode is a structural element having the electrolyte and cathode deposited upon it. Element thicknesses as shown are not to scale.

Each fuel cell includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of fuel cell B is electrically connected to an interconnect 28 by filaments 30 extending across but not blocking passageway 24. Similarly, cathode 18 of fuel cell A faces and is electrically connected to interconnect 28 by filaments 30 extending across but not blocking passageway 26. Similarly, cathode 18 of fuel cell B faces and is electrically connected to a cathodic current collector 32 by filaments 30 extending across but not blocking passageway 26, and anode 16 of fuel cell A faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of anode 16 and either interconnect 28 or cathodic current collector 32. Spacers 36,38 also serve to seal the perimeter of the stack against gas leakage and may be augmented by seals 37 (FIG. 2) specifically formulated for sealing against the surface of electrolyte 14; for example, compressed phlogopite mica can form an excellent gas seal.

Figure 2:
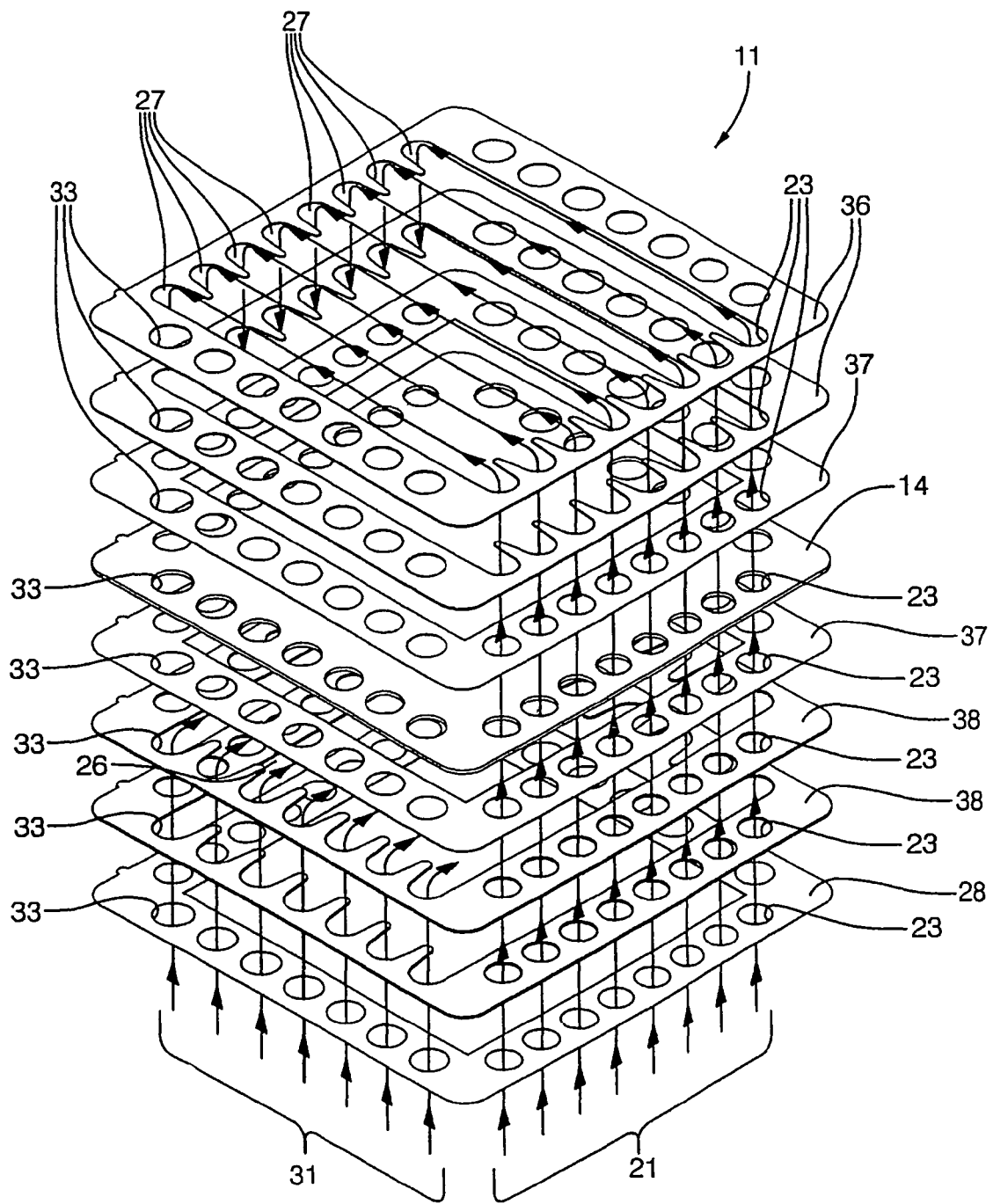
FIG. 2 is an exploded isometric view of a single solid oxide fuel cell, showing the various elements.
Figure 3:
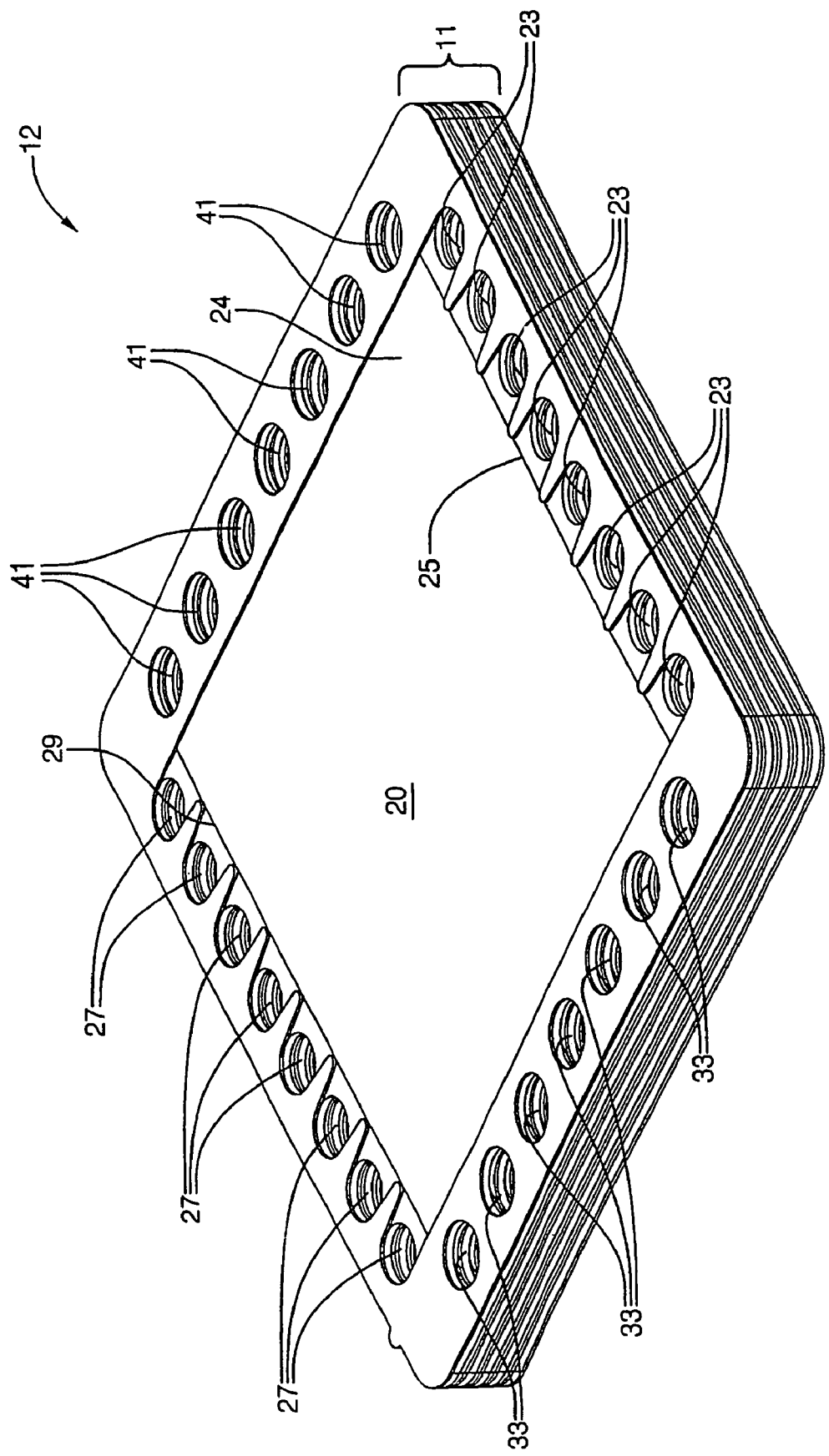
FIG. 3 is an isometric view of a fuel cell stack comprising five cells like the cell shown in FIG. 2.
Figure 4:
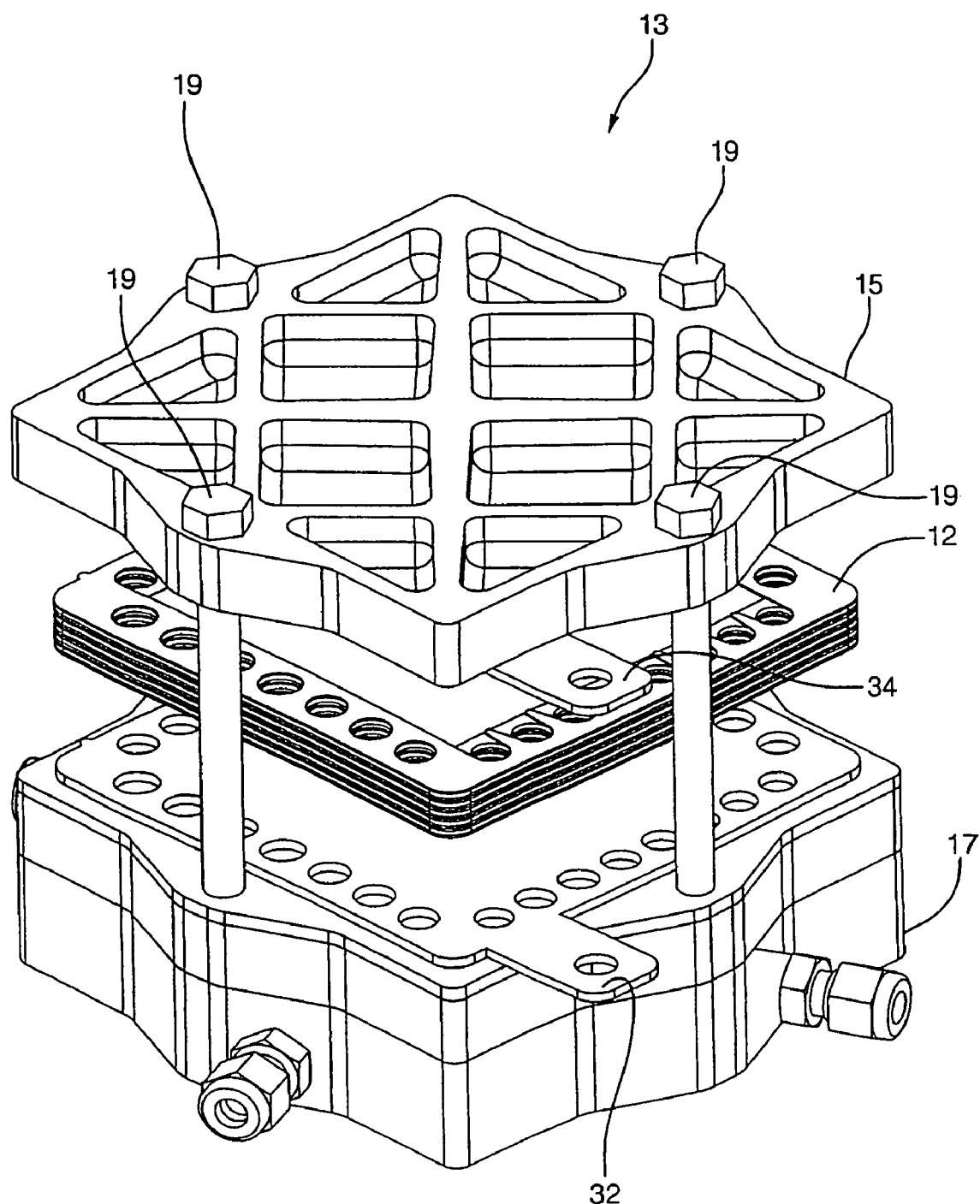
FIG. 4 is an isometric view like that shown in FIG. 3, partially exploded, showing the addition of current collectors, end plates, and bolts to form a complete fuel cell stack ready for use.

Referring to FIGS. 2 through 4, a plurality of individual fuel cells 11 may be stacked together to form a stack 12 (FIGS. 3 and 4) similar to schematic stack 10 shown in FIG. 1. Stack 12 comprises five such cells. Four separate planar, non-featured interconnect elements are distributed through the stack, one each between adjacent cells. To form a complete working fuel cell assembly 13 (FIG. 4), stack 12 is sandwiched between an anodic current collector 34 and a cathodic current collector 32 which in turn are sandwiched between a top plate 15 and a gas-manifold base 17, the entire assembly being sealingly bound together by bolts 19 extending through bores in top plate 15 and threadedly received in bores in base 17.

Preferably, the interconnect elements and the current collectors are formed of an alloy which is chemically and dimensionally stable at the elevated temperatures necessary for fuel cell operation, generally about 750° C. or higher, for example, Hastalloy. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed, for example, of a mixture of nickel and YSZ.

Referring to FIGS. 1 and 2, in operation, hydrogen or reformate gas 21 is provided via supply conduits 23 to passageways 24 at a first edge 25 of the anode free surface 20, flows parallel to the surface of the anode across the anode in a first direction, and is removed via exhaust conduits 27 at a second and opposite edge 29 of anode surface 20. Hydrogen (and CO if the fuel gas is reformate) also diffuses into the anode to the interface with the electrolyte. Oxygen 31, typically in air, is provided via supply conduits 33 to passageways 26 at a first edge 39 of the cathode free surface 22, flows parallel to the surface of the cathode in a second direction orthogonal to the first direction of the hydrogen, and is removed via exhaust conduits 41 at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 (cell B) or the interconnect 28 (cell A) via filaments 30. The electrolyte is permeable to the $O^{-2}$ ions which pass through the electrolyte and combine with four hydrogen atoms to form two water molecules, giving up four electrons to the anode and the anodic current collector 34 (cell A) or the interconnect 28 (cell B) via filaments 30. Thus cells A and B are connected in series electrically between the two current collectors, and the total voltage and wattage between the current collectors is the sum of the voltage and wattage of the individual cells in a fuel cell stack.

Figure 5:
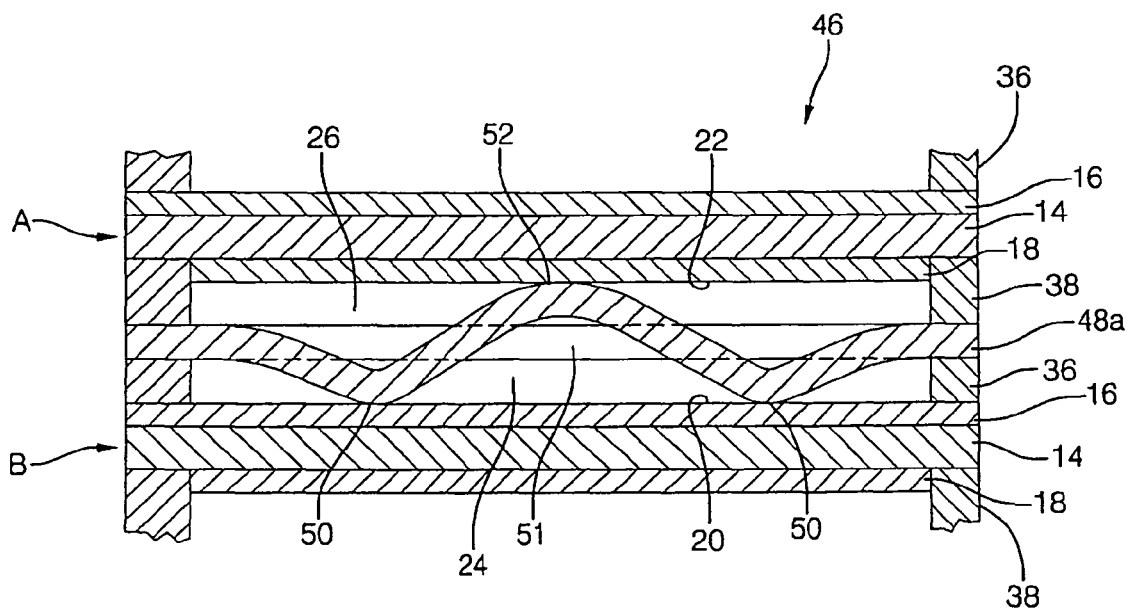
FIG. 5 is a schematic cross-sectional view showing a non-planar dimpled and bossed interconnect disposed between the anode and the cathode of adjacent fuel cells in a stack.

Referring to FIGS. 5 and 7-10, a portion 46 of fuel cell stack 10 includes cathode 18, electrolyte 14, anode 16, cathode spacers 38, and anode spacers 36 from each of fuel cells A and B. The fuel cells are joined by a first novel interconnect 48a in accordance with the invention. Interconnect 48a is non-planar and is featured to include dimples 50 and bosses 52 extending in opposite directions from a median plane of the interconnect and formed as by stamping or embossing a blank of planar sheet stock into a two-dimensional pattern 54 of dimples and bosses, as shown in FIGS. 7-10. When installed into a stack, as shown in FIG. 5, featured interconnect 48a extends into both anode passageway 24 and cathode passageway 26. The extension of the dimples into anode passageway 24 creates a tortuous pathway for reformate flowing through the passageway which increases turbulence and serves to provide fresh reformate having a high initial concentration of hydrogen continuously to the anode surface, thereby increasing overall consumption of hydrogen and electrical output of the stack.

The dimples and bosses of interconnect 48a also serve to increase the interconnect surface area available for heat exchange between Cell B's anode 16 and cooling oxygen flowing through cathode passageway 26 of Cell A, thereby reducing the heat load on the anode.

Preferably, dimples 50 depart from the median plane 51 of interconnect 48 sufficiently to make contact with the surface 20 of the anode, and bosses 52 depart from median plane 51 sufficiently to make contact with the surface 22 of the cathode, thereby completing the electrical circuit between Cells A and B, as shown in FIG. 5, obviating the need for a prior art filamentous foam 30 in passageways 24 and 26, as shown in the prior art stack 10 (FIG. 1). Contact of dimples and bosses with the anode and the cathode also provides a conductive path for heat transfer from the anode to the cathode, greatly increasing the cooling effect of air flowing through the cathode passageway.

It will be appreciated that whereas the features of interconnect embodiment 48a comprise dimples formed in inverse measure to bosses by deformation of a sheet, an interconnect embodiment within the scope of the invention may be featured with equivalent bosses formed on both sides as by molding or casting of the interconnect.

It will be further appreciated that whereas interconnect embodiment 48a has a regular two-dimensional pattern of bosses and dimples over its entire surface, other feature patterns may be selected as desired, within the scope of the invention. For example, fewer dimples and/or bosses may be provided for contact in regions of the anode having inherently low hydrogen concentrations and correspondingly higher oxygen ion concentrations. By locally restricting the current flow through the anode and electrolyte in these regions, such an interconnect can prevent accumulation of a surfeit of oxygen ions and thereby prevent unwanted and deleterious oxidation of nickel in the anode.

Figure 6:
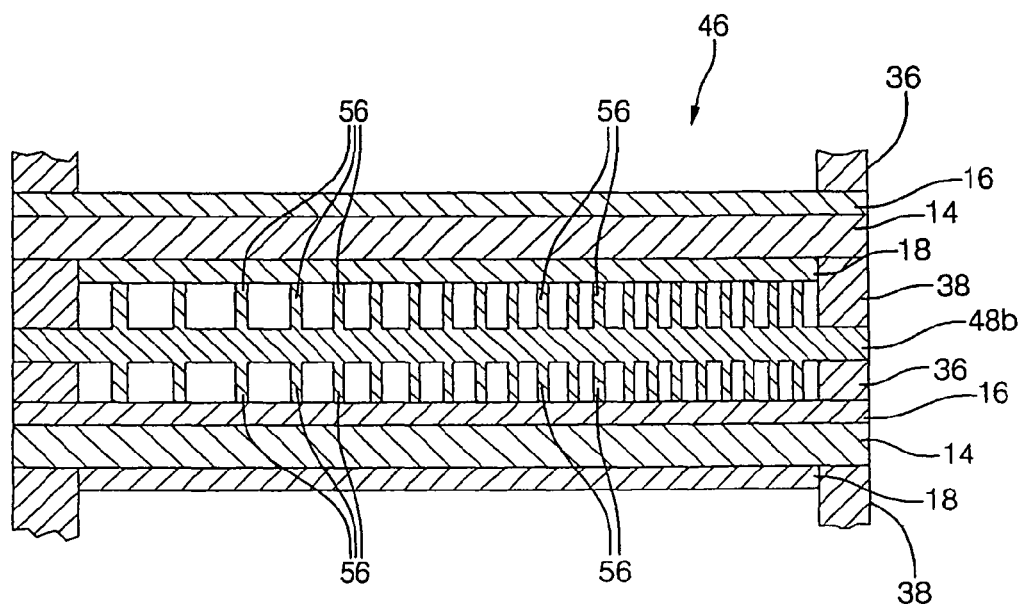
FIG. 6 is a schematic cross-sectional view like that shown in FIG. 5, showing a non-planar etched interconnect disposed between the anode and the cathode of adjacent fuel cells in a stack.

Referring to FIG. 6, another featured embodiment 48b of a non-planar interconnect may be formed from a planar blank as by machining or chemical etching to provide pins 56 extending toward and contacting both anode 16 and cathode 18. Pins 56 are analogous to bosses 52 in embodiment 48a. Embodiment 48b may also be formed in a two-dimensional pattern having regular spacing, like pattern 54, or pins 56 may be variably spaced, as shown in FIG. 6, to match the concentration profile of hydrogen gas in reformate as it flows through the cell from left to right.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for forming an interconnect element, the interconnect element being used for electrically connecting an anode and a cathode in adjacent fuel cells in a fuel cell stack, wherein the anode and the interconnect element define an anode passageway for reformate to flow therein, the reformate including hydrogen gas, the method including:
   determining a non-uniform concentration profile of hydrogen gas in reformate across the anode; and
   forming the interconnect element as a single layer including a plurality of featured surfaces that are variably spaced to match the determined non-uniform concentration profile of hydrogen gas in the reformate flowing across the anode.

2. The method recited in claim 1, further including the steps of:
   assembling the fuel cell stack to define an anode passageway for reformate to flow between the formed interconnect element and the anode; and
   flowing reformate through the anode passageway, wherein the flow of oxygen ions is metered through the fuel cell by the formed interconnect element to optimize the consumption of hydrogen in the fuel cell stack.

3. The method recited in claim 1, wherein a concentration of said plurality of featured surfaces increases as said concentration profile of said hydrogen gas increases.

4. The method recited in claim 1, wherein each of said plurality of featured surfaces is a boss and a dimple.

5. The method recited in claim 4, wherein said boss and said dimple are formed by injection molding.

6. The method recited in claim 4, wherein said boss and said dimple are formed by casting.

7. The method recited in claim 1, wherein each of said plurality of featured surfaces is a pin.

8. The method recited in claim 7, wherein said pin is formed in said interconnect element by etching.

9. The method recited in claim 8, wherein said pin is etched on an unfeatured planar blank.

\* \* \* \* \*